C. GRASSER.
PROCESS OF PRODUCING MOLDS AND PATTERNS.

Patented June 6, 1876.

WITNESSES
Chas. J. Gooch
Le Blond Burdett

INVENTOR
Charles Grasser
By Knight Bros Attorneys.

N. PETERS, PHOTO-LITHOGRAPHER, WASHINGTON, D. C.

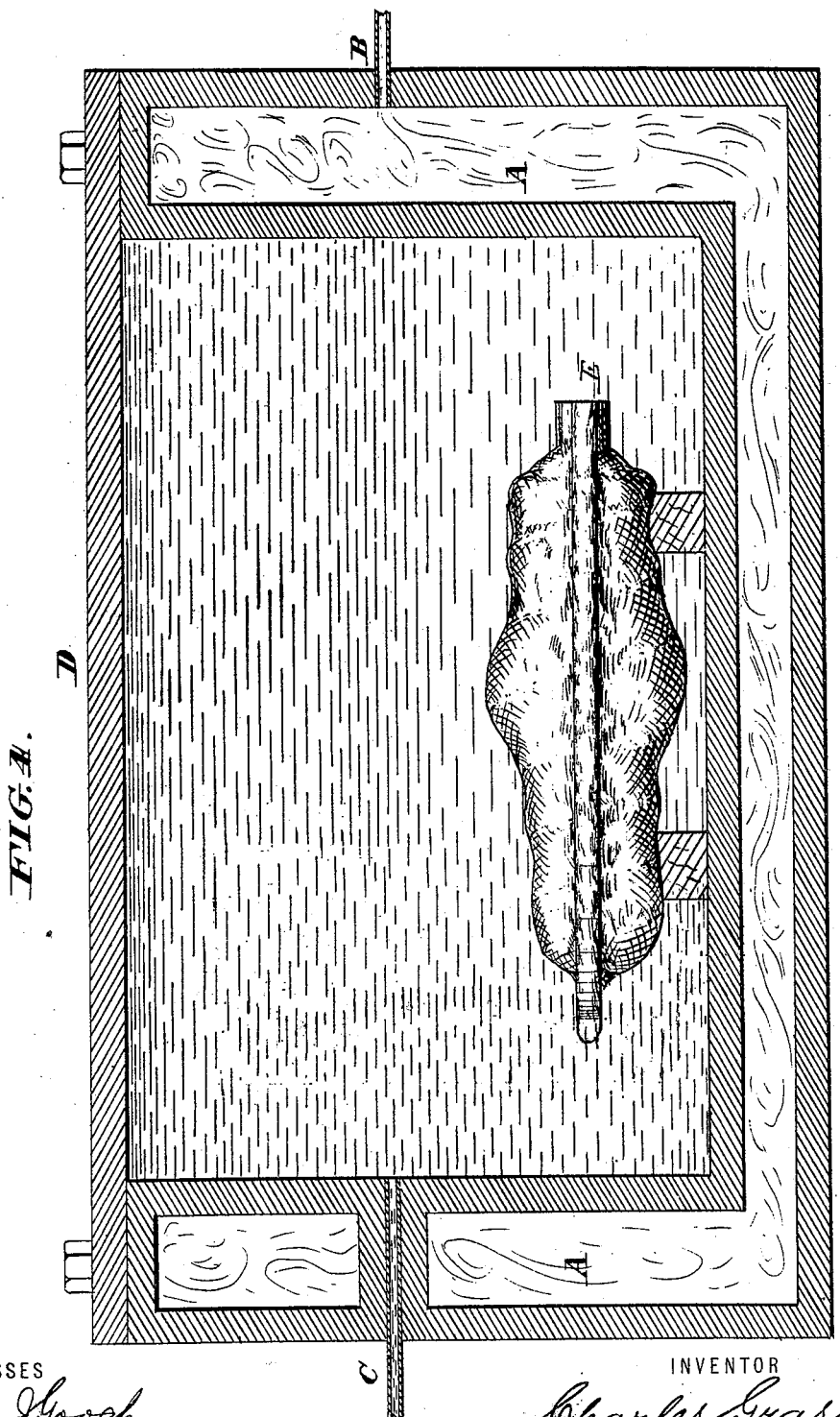

C. GRASSER.
PROCESS OF PRODUCING MOLDS AND PATTERNS.
No. 178,432. Patented June 6, 1876.
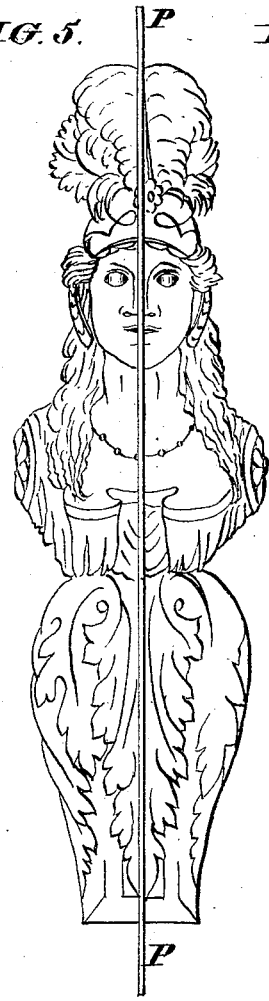
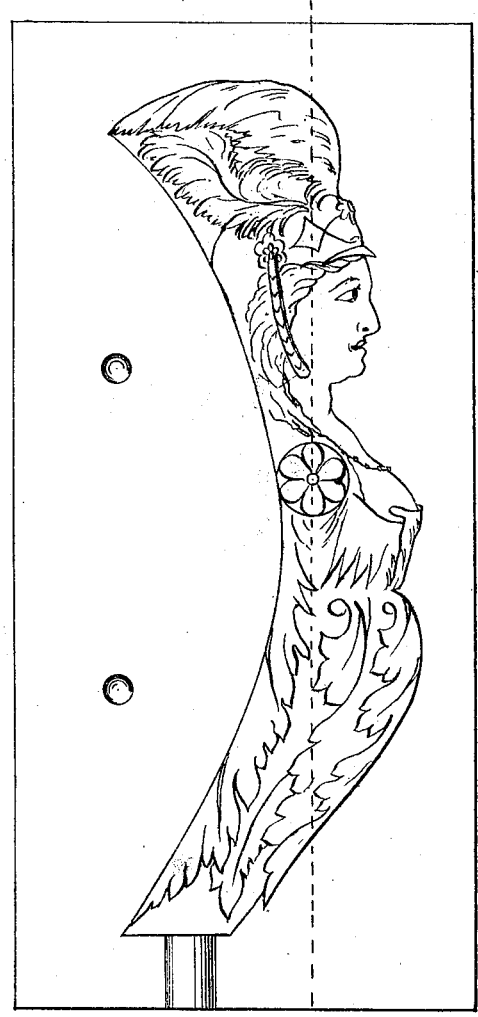
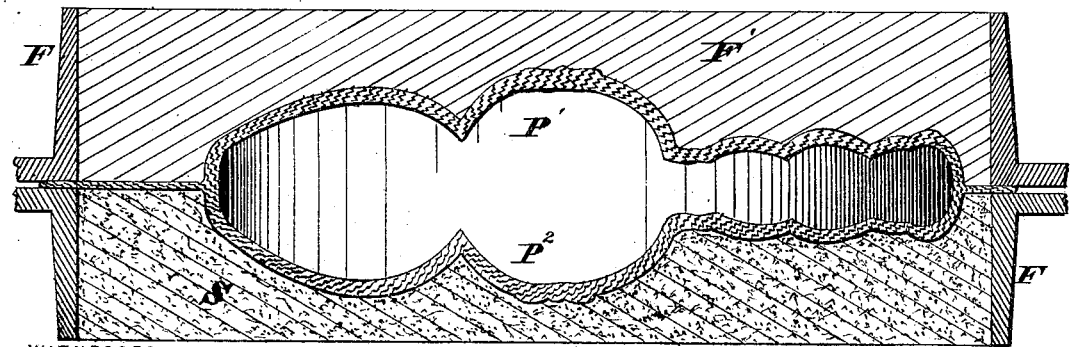
WITNESSES
Chas J Gooch
Le Blond Burdett
INVENTOR
Charles Grasser
By Knight Bros Attorneys.

C. GRASSER.
PROCESS OF PRODUCING MOLDS AND PATTERNS.

No. 178,432. Patented June 6, 1876.

WITNESSES
Chas J. Gooch
Le Blond. Burdett

INVENTOR
Charles Grasser
By Knight Bros Attorneys

N. PETERS, PHOTO-LITHOGRAPHER, WASHINGTON, D.C.

UNITED STATES PATENT OFFICE.

CHARLES GRASSER, OF SOMERVILLE, MASSACHUSETTS.

IMPROVEMENT IN PROCESSES OF PRODUCING MOLDS AND PATTERNS.

Specification forming part of Letters Patent No. 178,432, dated June 6, 1876; application filed January 25, 1876.

*To all whom it may concern:*

Be it known that I, CHARLES GRASSER, of Somerville, in the county of Middlesex and State of Massachusetts, have invented new and useful Improvements in Making Molds and Patterns, of which the following is a specification:

The object of the invention is to produce perfect, sharp, and well-defined molds of wax, plaster-of-paris, or other such like materials, which molds may be used in the art of electrotyping, casting of soft metals, or forming other substances into articles from the great variety of compositions out of which fancy and useful things are pressed or cast, and which may be formed or shaped in a wax or plaster mold.

Heretofore, the molds used in the art of electrotyping have been made of metal or wax, or of gutta-percha, or like semi-elastic material and compositions.

Metal and wax molds are used when the shape of the article to be reproduced would not present any undercut or projecting parts. Gutta-percha or such like compositions are used to take molds from such articles where the shape, design, and ornamentation present undercut or projecting places and parts. The making of a good and perfect mold in gutta-percha involves a great deal of labor, skill, and expense, to say nothing of the many restrictions and limits which are experienced in the making of such molds; besides that the gutta-percha or such like composition becomes useless, after a very limited use, by losing its semi-elastic property, so essential when the pattern is to be drawn from the mold.

By the use of my invention I overcome all these great objections to a gutta-percha mold by adopting a method by means of which I can make a wax mold from any article of which a reproduction in copper may be desirable, no matter how many undercut or projecting parts the shape, design, or ornamentation of such article may present.

My invention is likewise useful and important in the making or reproduction of molds from plaster-of-paris, which are used for a great variety of purposes, and which may be used to a still greater extent, as I am able, by the means of my invention, to produce plaster molds very cheaply, and in the best manner, of shapes and designs which could not be molded heretofore.

The method which I have invented to produce such wax and plaster-of-paris molds is comparatively simple, and the invention consists in the production, application, and use of a soft, pliable, and elastic pattern or model made of soft and elastic india-rubber.

By properly preparing such rubber pattern or model in the manner hereinafter described, I may take any number of molds from it either in wax or plaster-of-paris without the least injury to such pattern, and the molds are as perfect and sharp as the pattern.

The invention further consists in constructing an elastic pattern with a parting flange projecting from it to produce the joining faces or surfaces of the two half-molds, which are formed on the elastic pattern, in the manner hereinafter described. The invention further consists in a mode of coating an elastic rubber pattern, to prevent its cohesion to the material of the mold which may be formed thereon. The invention further consists in the use, in connection with elastic patterns, of support-molds, to properly sustain and hold one part of the pattern while an impression is taken from another part.

In the accompanying drawings, forming part of this specification, Figure 1 represents a front view of a figure which I select as an object for illustrating my invention. Said figure is concave on the back, so as to be attachable to a clock-case, of which it is to be a part.

Fig. 4 represents a vertical longitudinal section of a vessel which I use for vulcanizing or curing the rubber of which I make my elastic pattern. Such a vessel is formed by the combination of two vessels in such a manner as to inclose a small one by a larger one, leaving a space, A, between the two. Both vessels are connected at the top, thereby forming one body. The space A is connected, by a pipe, B, with a steam-generator for the supply of steam to heat the vessel for curing the rubber pattern. The inner vessel is provided and in connection with a pipe, C, by means of which it may be filled with water from the outside, after the cover D is firmly and hermetically closed. The water introduced through the pipe C is used to apply a uniform pressure of about eighty pounds to the square inch to the rubber of which the elastic pattern is made.

Fig. 5 represents a front view of the soft elastic rubber pattern, which is a copy of the original pattern carved in or sculptured in box-wood, and copied in the manner hereinafter described. The parallel lines P, running vertically through the center of the pattern, represent the edge of a flange or partition extending all around the pattern, dividing the figure in two sides or halves, which are connected by the same flange in one body.

Fig. 6 represents a side view of said pattern and the partition or flange.

Figure 8:
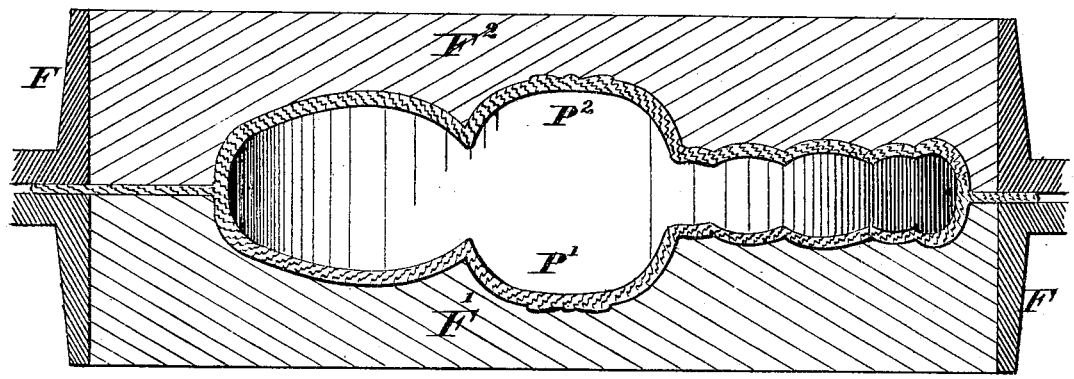

Figs. 7 and 8 are sectional views of a flask and pattern illustrating the mode of producing the mold in two parts.

Operation: The original pattern or model is to be made in box-wood, ivory, or such like material, or it may be made of metal melting at a low temperature, for reasons clearly seen hereafter. It is hardly necessary to state that the original pattern ought to be made as perfect as possible, as upon its perfection depends the perfection of the copy in elastic rubber. The first thing to be done with the original pattern is to produce a mold from it in metal. This may be done best and most cheaply by means of the electrotype process. It is necessary to make a mold of a figure in two parts. To do this I embed the original model in wax to a selected line of division.

Figure 1:
Figure 2:
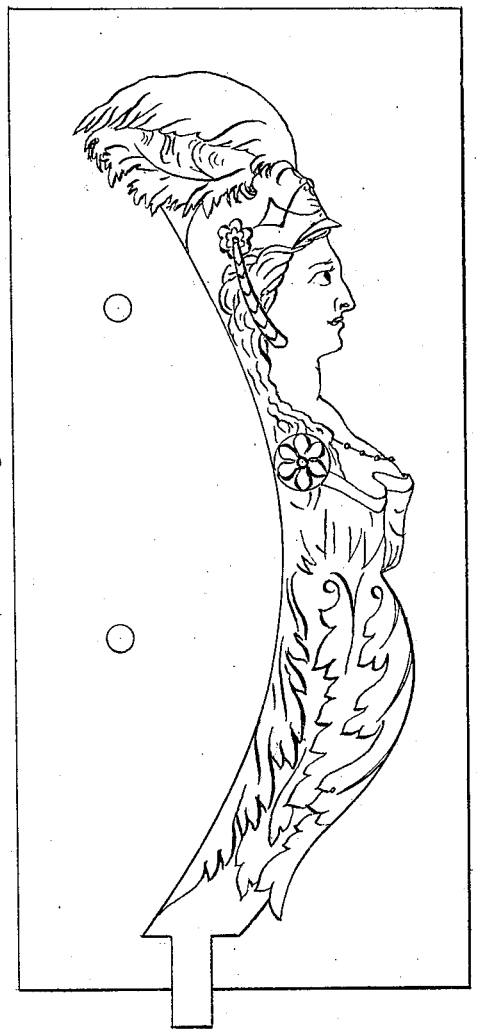
Fig. 2 is a plan of a wax bed, and represents a side view of the same figure, one-half embedded in the wax. Said wax bed extends all around the figure, so as to form a horizontal surface from the line of division.
Figure 3:
Fig. 3 represents a rear view of the figure and wax bed.

The wax bed is made even and smooth horizontally from the line of division, and may extend two inches, more or less, horizontally from the figure as it is represented in Fig. 2. When this is done the model and upper surface of the wax bed are prepared, in the well-known manner, for taking a copper deposit by means of the electrotype process. As soon as the copper deposit is about as thick as a card the wax bed is removed, and the other side of the figure is prepared for and receives a like deposit, including the flange formed by the deposit on the surface of the wax bed, after which the deposit of copper is continued all over until a thickness of about one-sixteenth of an inch is obtained. This produces a mold which is of sufficient strength to part without injury, the center of the flange formed by the alternate deposit being the point of parting.

On account of the many undercut and projecting parts and places of the model, there is but one way of its removal from the mold, which is done by destroying the model with fire. If of wood, it is burned out; if of metal, it must be melted. The copper mold formed over the model will resist such heat without injury.

After the mold is parted in the manner indicated, and all remaining particles of the model are carefully cleaned out, the copper mold receives a coating or plating of brass by means of the electrotype process, which is followed by another coat or plating of tin by the same process. The coat or plating of tin must be made as heavy as the mold will bear without injury to the sharpness or perfection of the same. Said plating of the mold with tin is of great importance, and must be applied with great care.

The coating or plating with brass and tin is for the purpose of protecting the copper mold against the injurious action of the sulphur in the rubber, as it is well known by rubber manufacturers that copper and brass molds cannot be used to vulcanize or cure rubber in them; but I have found that if a copper mold is properly plated with brass, and then with a heavy plating of tin, it will answer very well, and produce the best results.

Excepting the plating of the copper mold in the manner and for the purpose stated, there is nothing new in the production of a copper mold from a figure, in the manner described, and it may be done by any one skilled in the art of electrotyping; and I describe it only to give a correct understanding of the entire manipulation by which I produce my elastic pattern.

When the copper mold is made and prepared, as stated, it is ready to receive the rubber for the elastic pattern. The rubber to be used must be of pure caoutchouc, mixed with a required quantity of sulphur, to make soft elastic rubber.

In order to produce a perfect pattern I proceed as follows: First, I apply a thin coat of soap-water, or a coat of flexible collodion, to the surface of the mold. This coating is for the purpose of preventing the rubber from adhesion to the mold after the process of curing. When said coating is dry I apply a thin coating of a solution of raw rubber in benzine, so as to obtain a sticky or adhesive surface on the mold.

When such coating of rubber solution is dry I proceed to introduce the rubber in each half-mold in this manner: Small and suitable pieces of rubber, cut from a thin sheet, are carefully laid into all the small cavities of the mold, each being firmly pressed to the mold, to which it will adhere. Care must be taken to prevent the confinement of air in any of the cavities, which, if it takes place, will prevent a perfect impression. When all the cavities are filled, larger pieces of rubber may be used, until the whole interior surface of the mold, including the inner surface of the flange, is covered with a uniform layer. The first layer is followed by a second and third one, each being laid and pressed on carefully. For a pattern of small size, the several layers of rubber need not be thicker than one-eighth of an inch. For large patterns greater thickness is required for imparting the necessary stability to the pattern.

When both half-molds are laid out with rubber in the manner stated, they are carefully jointed, and pressed together by the flanges, so much as to squeeze the rubber partly out between the flanges, after which both halves are fastened together with some small screws through the flanges.

At some convenient place, as at E, a small hole of about half an inch is left in the mold, for the purpose of introducing water to the inside of the rubber pattern, the object of which will be seen hereafter. After joining the two halves of the mold, as stated, a layer of rubber is applied to the outside of the mold. Such outside layer must make a perfect and good connection with the rubber at the edge of the flanges, and over the edges of the small hole in the mold, with the rubber at the inside of the mold in close contact.

The rubber forming the elastic pattern will only take and retain a perfect impression of of the mold by pressure applied during the whole process of curing it.

The application of such necessary and uniform pressure to an irregular shape can only be effected by immersing the whole under water confined in the interior vessel of the vulcanizing apparatus under a pressure of about eighty pounds to the square inch. Therefore it is self-evident that great care should be taken to leave no spot in the layers and joints of the several pieces of rubber through which the water could reach the inner metal surface of the mold, which, if it took place, would prevent a sharp and perfect impression of the rubber to the mold. To guard against such an emergency, I apply the outside layer of rubber, and make a firm combination of this outside layer with the rubber between the flanges, and over the edge of the hole or opening used for the admission of water to the interior of the rubber pattern, for the purpose stated. I thus make a connection with the rubber forming the pattern. In this manner the metal mold is fully and completely surrounded or enveloped in rubber, leaving no chance for the water to come between the metal surface of the mold and the rubber, except by a carelessly-made joint in the rubber.

When the mold has received the rubber in the way described, the whole is placed in the inside of the vulcanizing-vessel, made on the plan represented in Fig. 4. The cover is firmly closed, and water is admitted and forced into the vessel through the pipe C until a pressure of about eighty pounds to the square inch is reached. By means of this pressure of water reaching the exterior of the body of rubber through the opening E the rubber is firmly pressed into every line and cavity of the mold, and is so kept during the whole time of curing. The heat required to cure the rubber is produced by admitting steam to the space A through the pipe B. The heat and length of time are regulated according to the mixture and quality of the rubber used, and are well known. To avoid blistering of the rubber, or changing shape after curing, and while still hot, the pressure of the water has to be kept on until the whole is cooled. When perfectly cooled the mold is removed, and the elastic pattern may be taken from the mold, which is done by cutting the outside layer of rubber from the edge of the flange and mouth of the hole, and by a gradual and careful parting of the copper mold. The elastic rubber pattern may thus be drawn out and is ready for use. This elastic pattern is a perfect impression of the mold, and a true copy of the original model. By means of the layers of rubber placed between the flanges of the mold a rubber flange is formed all around the pattern, dividing the pattern into halves on a parallel line at the place of the joint, as seen by the drawing, Figs. 5 and 6.

This rubber flange on the pattern is of great importance, and has to serve the useful purpose of forming the basis and parting partition of the wax or plaster molds to be taken from the pattern. Furthermore, it serves to keep the pattern in equal shape of contour or outline on the place of parting and jointing the half-molds, a matter of great importance, as it is highly essential that the molds taken from the pattern shall join well at the meeting edges or outline of the mold.

*Making of the molds.*—A pattern or model made of soft and elastic rubber is very easily pressed out of shape, and distorted even by a slight weight. To avoid this I provide what I shall call "support-molds." These I make and use in the following manner: First, I lay the elastic pattern on moist molding-sand, S, bringing it in the proper shape and position to embed it in the sand in the same manner as I did with the original model in the wax, and taking care to get the flange P of the elastic pattern in its normal position, resting on the margin of the lower half flask or frame containing the sand. This done I place a second metal frame or flask, F, of sufficient size and depth, as illustrated in Fig. 7, over the figure or pattern, resting the lower edge of the frame on the flange P. Then I apply plaster-of-paris carefully into every cavity of the pattern by means of a small brush, after which the frame is filled with plaster, F¹, to the edge of the frame and even therewith.

When the plaster has hardened the whole is turned over, and another frame, F, like the one used first, is placed over the other side of the pattern, as illustrated in Fig. 8, in the same manner as foundry-men use their flasks in molding from a pattern, and the plaster F² is applied and finished off in the same way first described.

When the plaster is hardened the mold so formed is carefully parted. The rubber pattern will admit of doing this, as it is a very yielding and elastic body compared with hardened plaster. This first-made mold I use for a permanent support of my elastic pattern.

In order to make further operations more easily understood, I shall call them half support-mold F¹, and half support-mold F². Likewise I will call the elastic pattern, although it is one body, half-pattern P¹, and half-pattern P². The support-molds are then made to admit of an easy replacing of the rubber pattern, which is done by cutting out the projections in the support-molds, care being taken to preserve the edge or contour of the mold at the jointing-line. When this is done I am ready to make molds for regular use, either in wax or plaster-of-paris.

*Mode of making wax molds.*—If wax or such like substance is melted and cast on india-rubber, it will stick to the same more or less. To remove it by force would injure the wax mold as well as the pattern; therefore a naked rubber pattern would be of no use for making wax molds. To overcome this great obstacle I resort to a coating of the rubber pattern, which coating is of such a nature as to prevent any sticking or adhesion of the wax to the rubber. At the same time it will permit a perfect and sharp cast, and does not impair the sharpest line of the pattern.

After a long series of experiments I found that a solution of salts, especially sal-ammoniac, mixed with glycerine, would answer as such a coating to my entire satisfaction. Such mixture is made in about the following proportions: In a gill of water I dissolve one ounce of sal-ammoniac, to which I add half a gill of glycerine. This mixture I apply with a brush to the surface of the pattern, carefully covering every part. In a short time the water in the mixture will evaporate, leaving a moist and very uniform coating of glycerine on the pattern.

It is well known how antagonistic glycerine is to a greasy or resinous substance, and also that it will not evaporate even under the influence of a higher temperature than the melting-point of wax. Of these properties I make good use in my invention.

Glycerine alone, or mixed with pure water, or even with alcohol, will not spread uniformly on a surface where the least greasy matter exists. As soon as the water or alcohol has evaporated the glycerine will gather in minute drops, in consequence of which numerous spots on the pattern would remain unprotected, to which the wax will stick. To produce a uniform and perfect coating of the pattern as required, I found it necessary to use a mixture of salts, water, and glycerine.

After preparing the rubber pattern in the manner stated, I place half-pattern P¹ in half support-mold F¹. Then a metal flask or frame, F, similar to those used for the support-molds, is placed over the pattern, resting it on the rubber flange, making a good joint to prevent the escape of the fluid wax, after which the wax is slowly poured over the pattern until the frame or flask is full. The temperature of the melted wax should not exceed that of boiling water, but cannot be much below, if a perfect and sharp mold is to be obtained. When the wax has become cold the rubber pattern may be easily withdrawn from the wax mold, as the rubber pattern will stretch and yield easily, thereby relieving readily all the undercut and projecting parts of the mold. The other half of the pattern is molded in the same manner, by placing half-pattern P² in the half support-mold F², and following out the same manipulations described. It is not necessary to describe the further preparation of a wax mold to deposit the copper, as it is well-known.

Articles of the shape of a figure, or a pot or vase, are most cheaply and practically reproduced by the electrotype process, by making them in two halves, and uniting the halves by soldering.

To take a mold by my method from an article in the shape of a dish or bass-relief, no matter how many sharp undercuts or projections in the ornamentation may be presented, is an easy matter compared with the labor required to make a mold in gutta-percha of the simplest thing.

*The making of plaster-of-paris molds.*—The making of a plaster mold from a rubber pattern is done in about the same manner, with few alterations required by the different nature of the plaster or according to the uses for which such plaster molds may be intended. If the plaster mold is to be used for the formation of a round body, such as a figure, pot, vase, &c., which is closed on all sides, or to be ornamented on all sides, and such an article is to come from the mold as a whole, and not in halves or parts, it will be necessary that the frame or flask used to hold the plaster shall be so arranged that all the flasks or frames to be used are provided with steady-pins and are interchangeable with each other, for the purpose of making a perfect joint or match of the outline or contour of the article molded. The use of the support-mold will bring the pattern at all times in the same position relatively to the steady-pins of the flask.

In taking a plaster-of-paris mold from a rubber pattern I use, as a coating to prevent the adhesion of the plaster, a solution of soap in water, which I apply with a brush to the pattern. After this I apply a thin layer of plaster-of-paris on the pattern, carefully introducing the same into every cavity, and then fill the frame, making it even on the top.

Other substances may be used to make molds from a rubber pattern besides wax and plaster—for instance, paraffine, mixed with wax, is a very good composition, and many other like compositions; but such compositions should not require a higher temperature to render them perfectly fluid and melted than that of boiling water, which is all the rubber pattern will stand without injury.

Molds made of wax and such like material are best adapted for use in the electrotype process, while plaster molds are useful for a great variety of things, such as castings in soft metals; also, for casting and forming articles from the great variety of fluid and plastic composition used for the manufacture of different things.

It is self-evident that a certain degree of judgment must be exercised on the part of the operator to adapt my invention practically to the great variety of molds which are required for differently-shaped articles. To define the proper parting-line for every article which is to be molded, so as to part the mold right, &c., would make an endless description. Persons skilled in the art of making molds will readily comprehend the great advantage of having such a pliable and elastic pattern as I make of india-rubber.

The following is what I claim as new and desire to secure by Letters Patent:

1. In the process of producing soft-rubber patterns, an impervious envelope or sack applied over the mold to prevent any access between the surface of the mold and the material to be molded of the water employed as the pressure-medium, substantially as set forth.

2. The process of applying pressure through the medium of water or other non-elastic fluid surrounding the mold, and introduced to the interior of the rubber to force it in contact with the mold.

3. The process of making a mold by means of a soft-rubber pattern, provided with a central flange to form the parting-surface of each half-mold, substantially as set forth.

4. In the process of making molds of wax, paraffine, or such like substance, from soft-rubber patterns, a coating of glycerine and a salt solution applied to the pattern to prevent its adhesion to the material of the mold.

5. The process of producing undercut molds, in plaster or other inelastic material, by the means substantially as described.

CHARLES GRASSER.

Witnesses:
ALEXR. WOOD,
J. J. C. SMITH.